June 21, 1966  H. HENKEL  3,256,748
HORN BUTTON ACTUATOR RING
Filed Jan. 10, 1964
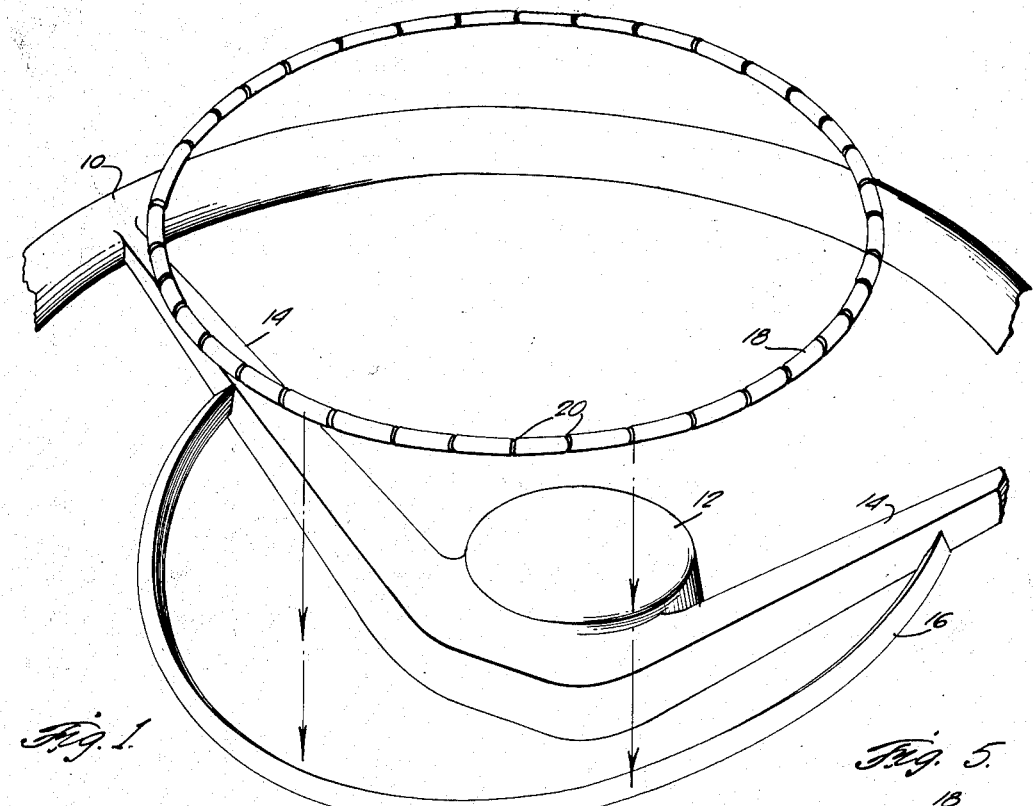
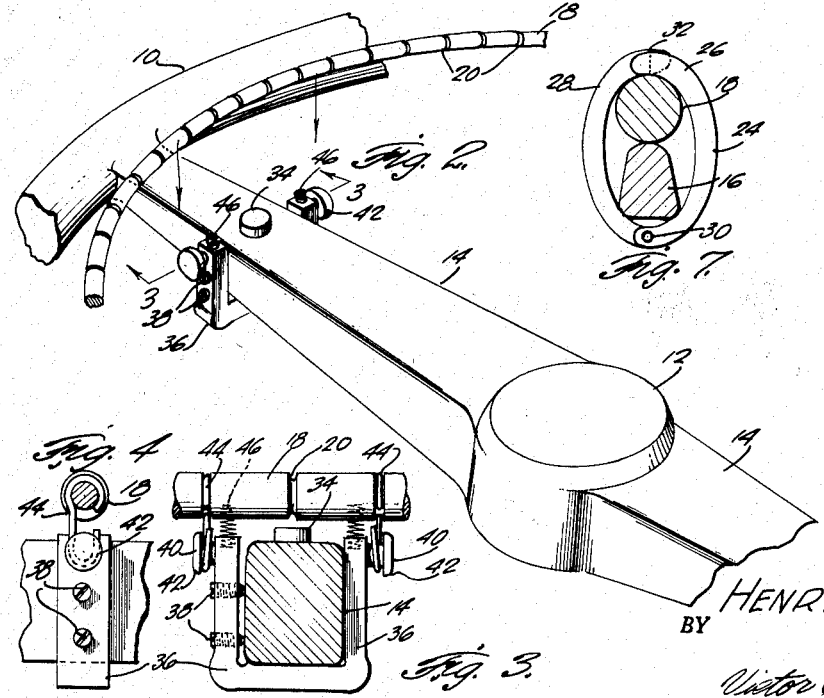
INVENTOR.
HENRY HENKEL
BY
Victor J. Evans & Co.
Attorneys

United States Patent Office 3,256,748
Patented June 21, 1966

3,256,748
HORN BUTTON ACTUATOR RING
Henry Henkel, 73—26 178th St., Flushing 66, N.Y.
Filed Jan. 10, 1964, Ser. No. 337,019
6 Claims. (Cl. 74—484)

This invention relates generally to a horn adapter and more particularly to an improvement for use with presently known vehicle steering wheel horn assemblies.

Many steering wheel horn actuating devices, particularly those employed in recent model automobiles, have been designed more for ornamental than for practical purposes. Such designs include the partial ring type which extends around only a portion of the steering wheel. Another of such devices is the bar or spoke type which extends radially from the center of the steering wheel. These types of horn actuating assemblies, because of their ornamental rather than practical design, provide several disadvantages in their operation and consequently do not provide optimum practical use.

One primary disadvantage inherent in such structures is that the horn actuator changes positions with the rotation of the steering wheel, resulting in difficulty in the operators locating it when it is to be actuated. For instance, in the partial ring type, since the horn actuator is located in one segment of the steering wheel, its position will change with rotation thereof. Also, in the bar type, wherein the horn actuator is located on a radial line of the steering wheel, its position will change with the rotation thereof. Since the steering wheel is located in one position during normal straight driving of the vehicle, the operator of the vehicle expects the horn actuator to be located in the same position. When the steering wheel is rotated, however, for purposes of changing direction of the vehicle, the operator may have difficulty in locating the horn actuator.

Furthermore, such partial horn actuator structures usually include a projecting edge which may be caught in the operator's clothing. Such interference with the steering of the vehicle may result in accident of the vehicle.

It is, therefore, a primary object of this invention to provide a horn adapter which is continuous around a periphery of the steering wheel.

Another object of this invention is to provide a horn adapter which cannot cause interference with the operator's clothing in the steering function of the vehicle.

Still another object of this invention is to provide a horn adapter which is easily mounted on presently known horn actuators.

These and other objects of the present invention will be more fully realized and understood from the following detailed description when taken in conjunction with the accompanying drawing wherein:

FIGURE 1 is a fragmentary perspective view of one type of presently known horn actuator showing the ring of the present invention disposed for mounting thereon;

FIGURE 2 is a fragmentary perspective view of another type of horn actuator with a portion of the invention mounted on the steering wheel and the ring disposed for mounting therewith;

FIGURE 3 is a fragmentary sectional view taken along lines 3—3 of FIGURE 2 with the ring in mounted position;

FIGURE 4 is a side elevational view of the structure shown in FIGURE 3;

FIGURE 5 is a sectional view taken through the horn adapter and actuator and illustrating the mounting means therewith;

FIGURE 6 is a sectional view similar to FIGURE 5 but illustrating another mounting means; and FIGURE 7 is another sectional view similar to FIGURE 5 and illustrating still another mounting means.

Like reference numerals throughout the various views of the drawing are intended to designate the same or similar structures.

With reference to the drawing in detail, a steering wheel is generally designated with numeral 10. The steering wheel shown in FIGURE 1 includes a hub portion 12 having spokes 14 radiating therefrom. A horn actuator is illustrated generally by a partial ring 16 mounted between the spokes. A continuous ring 18 of the present invention is disposed for being mounted on the horn actuator to provide actuation thereof around the entire periphery of the steering wheel. Ring 18 includes a plurality of grooves 20 for facilitating the mounting thereof on the horn actuator and may also provide an ornamental appearance thereto.

Ring 18 is mounted on actuator 16 by any one of the clip structures illustrated in FIGURES 5, 6, and 7. As shown therein, ring 18 is mounted directly on actuator 16 and clip 22 is disposed in one of the grooves 20. Clip 22 extends around actuator 16 and a respective groove 20 in ring 18 for rigidly mounting the ring on the actuator.

The clip structures shown in FIGURES 5 and 6 illustrate two of the preferred forms which may be employed for mounting the continuous ring of the present invention. As shown in FIGURE 7 another form of the clip structure is illustrated by a clip 24 having a pair of segments 26 and 28 thereof pivoted to one another at a point 30. The free ends of the segments include cooperating locking structures generally designated by the numeral 32.

The steering wheel as shown in FIGURE 2 illustrates another prior known horn actuator structure and includes the hub 12 and spokes 14. A depressable horn button 34 is mounted in each spoke of the steering wheel. This type of horn actuating devices may include a bar connected to hub 12 and extending across spokes 14 for actuation of button 34. It is to be understood that the embodiment as shown in FIGURE 2 may be employed with the bar or spoke type of horn actuating devices.

The adapter structure illustrated in FIGURE 2 includes a mounting support 36 having set screws 38 disposed therein for engaging spoke 14. Support 36 includes a pair of projecting fingers 40 each having a retaining head 42 thereon. Support 36 is positioned on spoke 14 in aligned relationship with the horn button 34.

A pair of clips 44 are disposed for engaging a groove 20 at a finger 42. Disposed between ring 18 and mounting support 36 are a pair of springs 46. The ring and mounting support each include holes for housing spring 46.

As shown most clearly in FIGURE 3, clips 44 engage a respective groove 20 and finger 40 for maintaining ring 18 in a spaced relationship with horn button 34. Clips 44 are disposed for relative movement on finger 40 to allow ring 18 to depress the horn button. Springs 46 maintain a bias on ring 18 away from horn button 34.

In each of these embodiments it can be seen that depression of ring 18 will cause a similar depression of the horn actuator. Since the ring is continuous around the periphery of the steering wheel, rotation of the wheel does not remove the adapter from the operator's expected position thereof.

The principles of the invention explained in connection with the specific exemplifications thereon will suggest many other applications and modifications of the same. It is accordingly desired that, in construing the breadth of the appended claims they shall not be limited to the specific details shown and described in connection with the exemplifications thereof.

What is claimed is:
1. In a vehicle steering wheel horn assembly having a depressable horn actuator, the improvement therewith residing in an adapter comprising a continuous spokeless ring having a groove therein and a clip disposed in said groove and engaging the horn actuator.

2. The improvement of claim 1 wherein said clip is resilient and disposed for biasing a portion of said spokeless ring in fixed engagement with the horn actuator.

3. The improvement of claim 1 wherein said clip includes a pair of pivotally connected segments having cooperating snap locks at the free ends thereof, said clip disposed for engaging said spokeless ring and the horn actuator in fixed engagement with one another.

4. The invention of claim 1 wherein a generally U-shaped mounting support adapted to be disposed on said steering wheel has ends for engagedly securing with ends of said clip.

5. The invention of claim 4 wherein the ends of the U-shaped mounting support has a head and finger for engaging the ends of said clip.

6. In a vehicle steering wheel horn assembly having a depressable horn actuator, the improvement therewith residing in an adapter comprising a continuous ring, means for biasing said ring in one position of non-engagement with the horn actuator and allowing movement thereof to another position of depressing engagement with the horn actuator, said means including a mounting support secured to the steering wheel, a spring disposed between said support and said ring, said ring including a groove, and a clip connected between said support and said groove, said clip disposed for relative movement with respect to said support.

References Cited by the Examiner

UNITED STATES PATENTS

| | | | |
|---|---|---|---|
| 1,621,408 | 3/1927 | Holstein | 200—61.56 |
| 1,960,665 | 5/1934 | Hudson | 200—61.56 |
| 2,131,542 | 9/1938 | Peters et al. | 74—484 |
| 2,276,477 | 3/1942 | George | 74—484 |
| 2,737,060 | 3/1956 | Russell | 74—557 |
| 2,778,898 | 1/1957 | Lenning | 74—484 X |
| 2,828,645 | 4/1958 | Wilfert | 74—484 |

FOREIGN PATENTS

| | | |
|---|---|---|
| 30,560 | 3/1926 | France. (Addition to No. 594,136) |
| 251,892 | 5/1926 | Great Britain. |

BROUGTON G. DURHAM, *Primary Examiner.*

C. F. GREEN, *Assistant Examiner.*